United States Patent [19]
Hester et al.

[11] Patent Number: 5,349,580
[45] Date of Patent: Sep. 20, 1994

[54] METHOD AND APPARATUS FOR CHANNEL ALLOCATION INTEGRITY IN A COMMUNICATION NETWORK

[75] Inventors: Phillip Hester, Indian Harbour Beach; William Highsmith, Indialantic, both of Fla.

[73] Assignee: Scientific-Atlanta, Inc., Atlanta, Ga.

[21] Appl. No.: 165,889

[22] Filed: Dec. 14, 1993

Related U.S. Application Data

[62] Division of Ser. No. 880,209, May 8, 1992, abandoned.

[51] Int. Cl.⁵ ............................................. H04J 3/22
[52] U.S. Cl. .................................. 370/84; 370/95.1; 455/54.2
[58] Field of Search ............... 455/49.1, 53.1, 54.2, 455/68; 379/58, 63; 370/69.1, 84, 95.1, 95.3; 340/825.03, 825.07, 825.54

[56] References Cited

U.S. PATENT DOCUMENTS

| | | | |
|---|---|---|---|
| 4,477,809 | 10/1984 | Bose | 455/54.2 |
| 4,553,262 | 11/1985 | Coe | 455/54.2 |
| 4,763,325 | 8/1988 | Wolfe et al. | 370/95.3 |
| 4,780,715 | 10/1988 | Kasugai | 455/54.2 |
| 5,005,171 | 4/1991 | Modisett, Jr. et al. | 370/84 |

*Primary Examiner*—Benedict V. Safourek
*Attorney, Agent, or Firm*—Banner, Birch, McKie & Beckett

[57] ABSTRACT

A communication network having a master and a plurality of remotes, these remotes supporting a plurality of co-services, in which access to inbound frequencies among the remotes is shared. When a need by a remote for an extraordinary amount of bandwidth is detected, a reserved spillover frequency from a set of frequencies is reserved for that remote. This bandwidth is reallocated when the need for extraordinary bandwidth for that remote has ended.

10 Claims, 6 Drawing Sheets

```
        Remote1                  Master              Demod

===power int==>
               <-------broadcast alloc tbl--
=power intrup==>
               ---request alloc update------>
               <----------alloc tbl---------
          .          .          .
=reset========>
               ---request alloc update------>
               <----------alloc tbl---------
          .          .          .
               -------reservation request--->
               <----b.c. subchannel definition--
=chksum fail==>
               ---request alloc update------>
               <----------alloc tbl---------
          .          .          .
                                        <==correlate==
                                        <---collision--
                                              signal
               <--------b.c. alloc tb.-----
```

FIG. 7

METHOD AND APPARATUS FOR CHANNEL ALLOCATION INTEGRITY IN A COMMUNICATION NETWORK

This application is a division of application Ser. No. 880,209, filed May 8, 1992, now abandoned.

FIELD OF THE INVENTION

The present invention relates to the field of communication networks having a master and a plurality of remotes, and more specifically to the allocation of extraordinary bandwidth on demand to a remote or remotes.

BACKGROUND OF THE INVENTION

A communication network may comprise, for example, a number of remote satellite communication terminals (or "remotes") that communicate either with a hub (terminal or "master") or with one of the other remotes through the master. The outbound frequencies from the master are broadcast, while the inbound frequencies are shared using any of a variety of access methods. Some of these access methods include: TDMA, contention (slotted aloha), demand-assigned and others.

Each of the remotes can provide access to the network for a number of co-services through the remote's RF equipment. Some of these co-services include: Data (interactive, LANs, computer-computer, etc.); digital voice (switched, unswitched); SCADA (unswitched); digital video (switched, unswitched); and others. A problem with such an arrangement is due to the requirement of supporting different types of co-services. Some of these co-services are characterized as "bursty" traffic, and include LANs, file transfers, demand voice and others. This bursty traffic significantly exceeds the average bandwidth requirement for the community of remotes that share the inbound and/or the outbound frequencies. Interactive response time could suffer, or one type of service might dominate others with respect to traffic engineering.

There is thus a need for a network in which remotes are allocated bandwidth on demand in an efficient manner, and in which this bandwidth is reallocated among the remotes when it is no longer demanded by a specific remote or remotes. There is also a need for a network in which the community of sites reliably are made aware of and abide by the allocations.

SUMMARY OF THE INVENTION

These and other needs are met by the present invention which provides a network and a method for operating a communication network having a master and a plurality of remotes, these remotes supporting a plurality of co-services. The network comprises means for sharing access to inbound frequencies among the remotes, means for detecting a need by a remote for an extraordinary amount of bandwidth, and means for allocating to a remote a reserved spillover frequency from a set of frequencies in response to the detection of a need for extraordinary bandwidth for that remote. There are also means for reallocating the remote which has been allocated to the spillover frequency to one of the remaining frequencies when the need for extraordinary bandwidth for that remote has ended.

With the present invention, a network is provided that responds to needs for extraordinary amounts of bandwidth, without wasting an excessive amount of bandwidth, by using an auxiliary, "spillover" channel to which a remote can be temporarily assigned.

Another embodiment of the present invention provides a communication network having a master and a plurality of remotes, these remotes supporting a plurality of co-services, the network comprising means for sharing access to at least one slotted frequency among the remotes, means for detecting a need by a remote for an extraordinary amount of bandwidth, means for allocating to at least one remote a reserved set of slots of a frequency in response to the detection of a need for extraordinary bandwidth for that remote, and means for reallocating the slots which the at least one remote has been allocated so as to make said allocated slots available for use by all remotes in the network when the need for extraordinary bandwidth for that remote has ended, and means for determining the end of the need for extraordinary bandwidth by a credit mechanism.

This embodiment of the present invention provides an efficient mechanism for determining the utilization of allocated bandwidth by a remote, and causes the remote to return the allocated bandwidth to the network when the utilization falls below (or exceeds) a predeterminable threshold.

Another embodiment of the present invention provides a communication network having a master and a plurality of remotes, these remotes supporting a plurality of co-services, the network comprising means for sharing access to at least one slotted frequency among the remotes, means for detecting a need by a remote for an extraordinary amount of bandwidth, said remote being a demanding remote, means for allocating to a demanding remote at least one reserved set of slots corresponding to at least one initial subchannel of a frequency in response to the detection of a need for extraordinary bandwidth for that remote, means for dividing the initial subchannel into separate secondary subchannels and assigning different secondary subchannels to a plurality of different demanding remotes, means for recombining the secondary subchannels which have been divided when the need for extraordinary bandwidth for one of the demanding remotes using one of the divided secondary subchannels has ended.

This embodiment of the present invention prevents the blocking of remotes which may otherwise occur if fewer channels are defined than are actually needed. It also avoids the problem of a single site using only 1/n of the available bandwidth (non-effective use of the allocatable bandwidth) that otherwise occurs if the bandwidth of the subchannels is fixed and "n" is the number of available subchannels.

Another embodiment of the present invention provides a communication network having a master and a plurality of remotes, these remotes supporting a plurality of co-services, the network comprising means for sharing access to inbound frequencies among the remotes, means for detecting a need by a remote for an extraordinary amount of bandwidth, means for allocating to a remote a reserved amount of bandwidth in response to the detection of a need for extraordinary bandwidth for that remote, and means for informing each of the remotes of the network of the allocations of the bandwidth.

This embodiment of the present invention provides for efficient use of the dynamically allocated bandwidth by requiring that the community of sites be aware of and abide by the allocations. This occurs even where the remote site has experienced a temporary inability to hear the broadcasted allocations due to a rain fade or electrical interference, for example, or when a new remote site has been installed in the network.

Other objects, advantages and novel features of the present invention will become apparent from the following detailed description of the invention when considered in conjunction with the accompanying drawings.

BRIEF DESCRIPTION OF THE DRAWINGS

FIG. 7 illustrates a process in accordance with an embodiment of the present invention for providing reservation integrity.

DETAILED DESCRIPTION OF THE DRAWINGS

Figure 1:
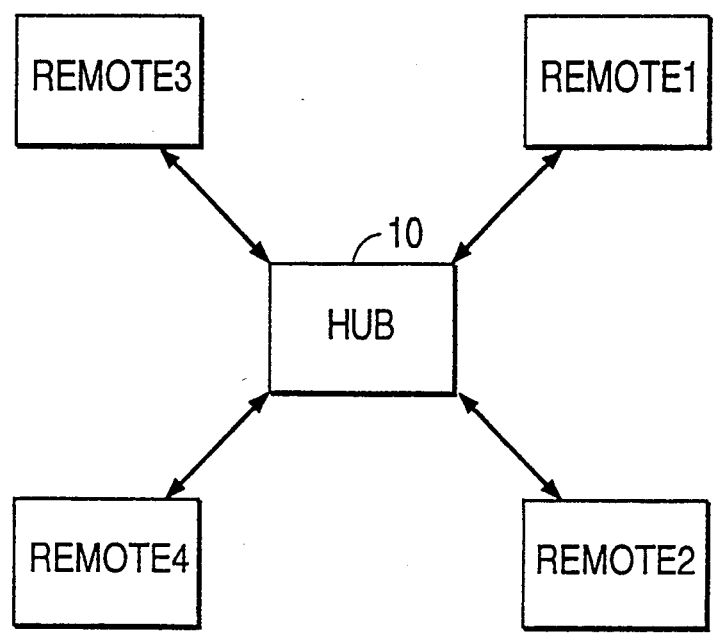
FIG. 1 is a block diagram of a communication network constructed in accordance with an embodiment of the present invention.

FIG. 1 illustrates an example of a communications network which uses the present invention. This network may comprise, for example, a number of remote satellite communication terminals (remotes 1–4) that communicate either with a hub (to the remotes or "master" 10 ) or with one of the other remotes through the master 10. The outbound frequencies from the master 10 to the remotes are broadcast, while the inbound frequencies from the remotes to the hub are shared using any of a variety of access methods. Some of these access methods include: TDMA, contention (slotted aloha), demand-assigned and others.

Each of the remotes 1–4 can provide access to the network for a number of co-services through the remote's RF equipment. Some of these include: Data (interactive, LANs, computer-computer, etc.); digital voice (switched, unswitched); SCADA (unswitched); digital video (switched, unswitched); and others. A problem with such an arrangement as shown in FIG. 1 is due to the requirement of supporting different types of co-services. Some of these co-services are characterized as "bursty" traffic, and include LANs, file transfers, demand voice and others. This bursty traffic significantly exceeds the average bandwidth requirement for the community of remotes 1–4 that share the inbound and/or the outbound frequencies. Interactive response time could suffer, or one type of service might dominate others with respect to traffic engineering.

To solve this problem, the present invention provides two different sets of the inbound and outbound frequencies. These subsets are the "home frequencies" and the "spillover frequencies". Normally, traffic is carried to and from the remotes over the home frequencies. When there is an indicated need for an extraordinary amount of bandwidth for a co-service, then that particular remote is assigned to one of the spillover frequencies for the duration of a demand period.

Figure 2:
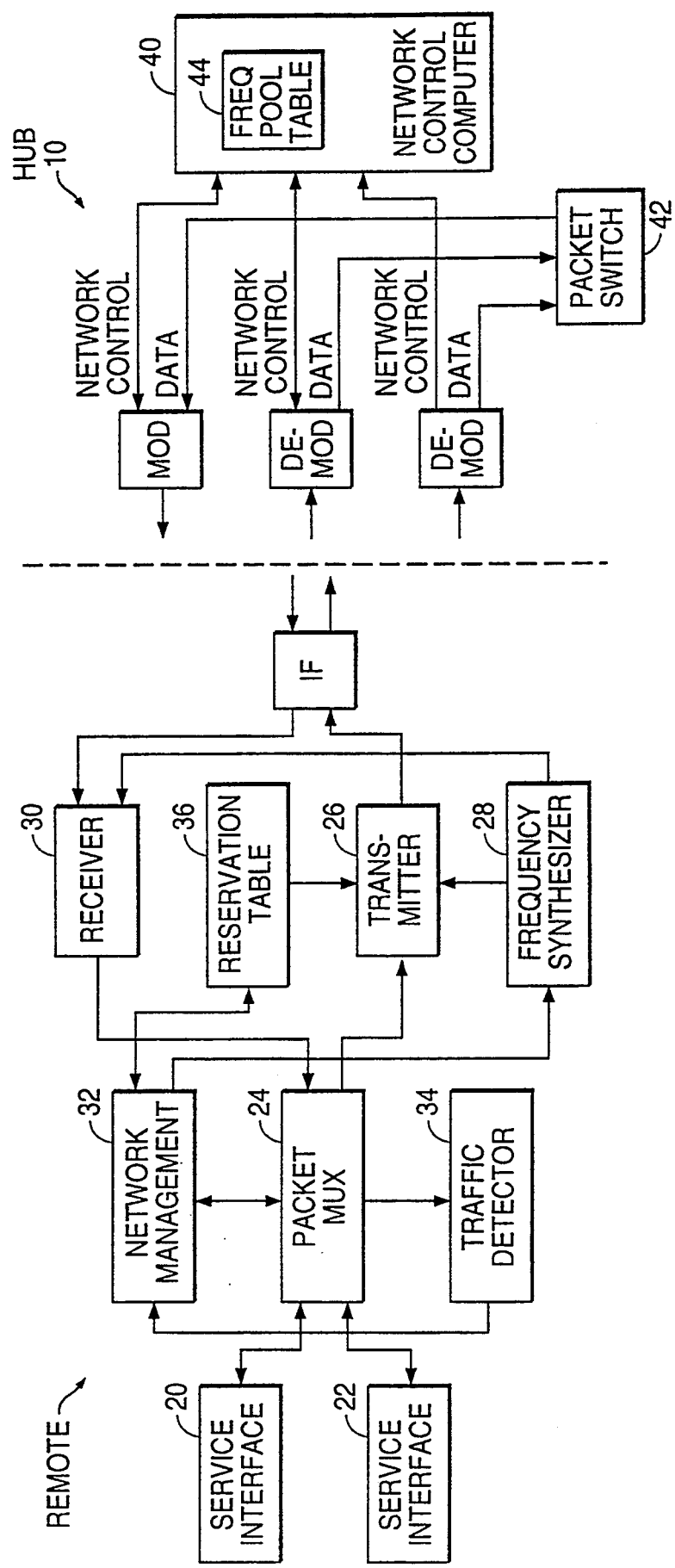
FIG. 2 is a block diagram illustrating in more detail a single remote and a master from the network of FIG. 1.

A single, exemplary remote 1 and a master 10 are shown in more detail in block diagram form in FIG. 2. The remote 1 has a plurality of service interfaces 20, 22 that provide an interface between the co-service and the remote 1. The co-service coupled to service interface 20 may be data, for example, while the co-service coupled to service interface 22 may be a LAN.

The service interfaces 20, 22 are each coupled to a packet multiplexer 24 which multiplexes the different co-services together and provides them to a transmitter 26 for transmission. A frequency synthesizer 28 controls the frequency the transmitter 26 and a receiver 30 are on. The frequency synthesizer 28 is controlled by signals from network management 32, which is also coupled to receive information from the packet multiplexer 24 and a traffic detector 34. The remote 1 has a reservation table 36 that keeps track of what frequencies are being used in the network.

The master 10 comprises a network control computer 40 that controls a number of modems and demods, with a separate modem and demod assigned to each frequency. Data is routed through a packet switch 42. The network control computer 40 of the master 10 has a frequency pool table 44 that keeps track of the frequencies being used and the availability of the remainder. The computer 40 also has an access manager coupled to an access plan and a network definition.

The traffic detector 34 of the remote 1 detects conditions or events that indicate the need for an extraordinary amount of bandwidth for a co-service. Some of these are automatic, application-related events, such as a telephone going off-hook; network congestion; excess queuing or aging of data; perceived burst of traffic; circuit setup request. Others are administrative procedures such as manual operator intervention and timed events. Other events or conditions may also indicate the need for more bandwidth.

In addition to detecting the events or conditions that trigger the need for more bandwidth, the traffic detector also detects when this bandwidth is no longer needed. These signals may include, but are not limited to: a telephone going on-hook, cessation of network congestion, depletion of an awaiting queue, end of a perceived burst of traffic, circuit clear request, manual operator intervention, and timed events.

The traffic detector 34 detects the conditions or events requiring the use of a spillover frequency in a conventional manner. For example, the traffic detector 34 monitors the status messages from voice codec units and can determine when the telephone goes on or off hook. Going off-hook causes the traffic detector 34 to send a signal to the network management 32 to request the use of a spillover frequency. After the call is completed, the telephone goes on hook and this is detected by the detector 34. Another signal is sent from the detector 34 to the network management 32 to inform it that there is no longer a need for the extraordinary bandwidth. The telephone on-hook/off-hook example described above is but one example of detectable conditions or events that are used by the network management 32 to determine the need for extraordinary bandwidth.

Figure 3:
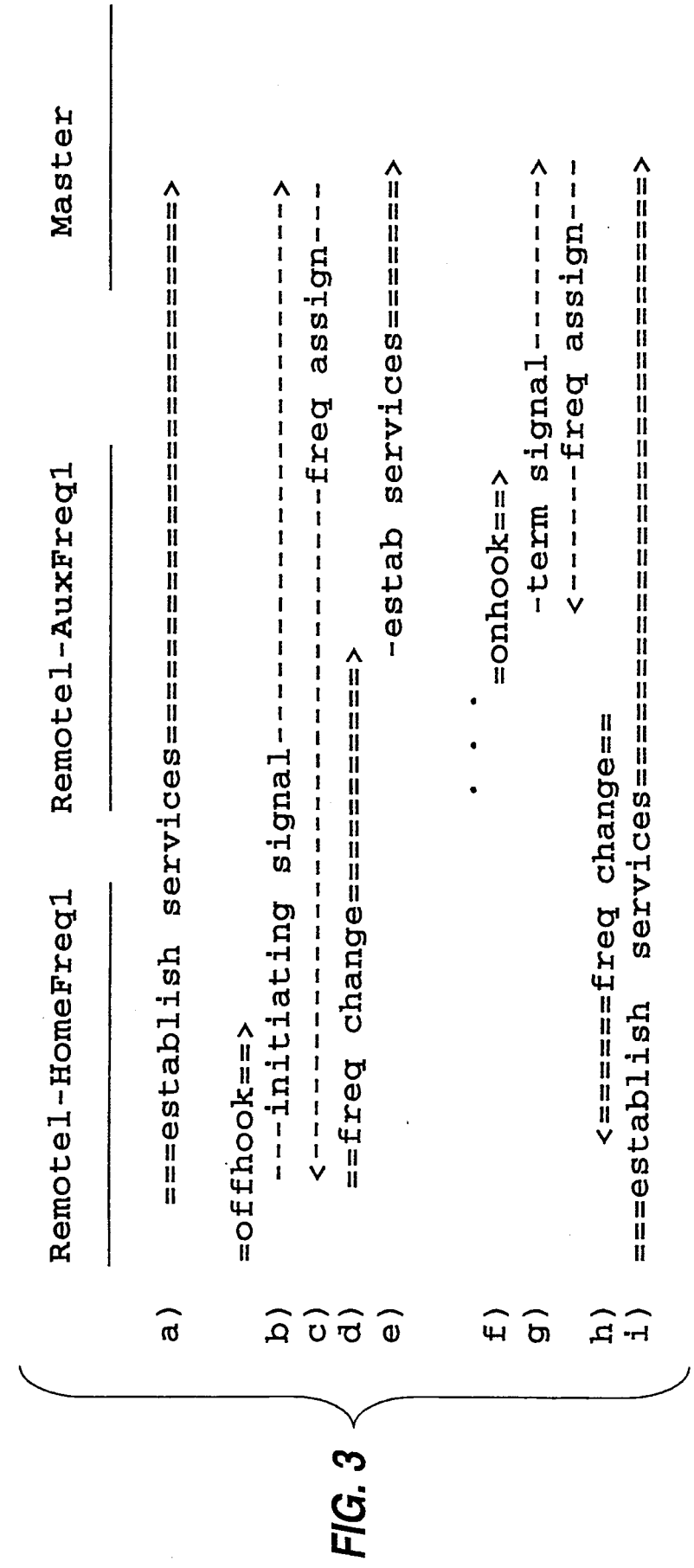
FIG. 3 illustrates an exemplary protocol for managing the spillover frequencies in accordance with an embodiment of the present invention.

One exemplary procedure followed by the network management 32 and the master station 10 is illustrated in FIG. 3 using the example of off-hook/on-hook as determining the need for extraordinary bandwidth. In step a), the remote 1 establishes services over home frequency 1 (HomeFreq1) with the master 10. At some point in time, the traffic detector 34 detects a telephone connected to remote 1 going off-hook. Accordingly, the traffic detector 34 sends a signal to the network management 32 of remote 1. The network management 32 then causes an initiating signal to be sent through the packet multiplexer 24 to the master 10, (step b). The master 10 assigns the remote 1 to a spillover frequency (AuxFreq1 in FIG. 3) in step c). The remote 1 then changes its frequency synthesizer 28 accordingly in step d), and services are established in step e).

At some point in time, the telephone goes on-hook at remote 1, ending the need for the use of the spillover frequency. Remote 1 sends a termination signal to the master 10 in step f), which then assigns the remote 1 to another home frequency HomeFreq1 in step g). The remote 1 changes frequency in step h).

Other protocols than that illustrated in FIG. 3 for managing the spillover frequencies are contemplated and readily apparent to one of ordinary skill in the art.

In an embodiment of the present invention, a remote will move all of its co-services together to the spillover frequency in addition to the co-service which caused the remote to request the use of a spillover frequency. Also, more than one remote can share (simultaneously use) the spillover frequencies.

In certain embodiments the spillover frequencies have a different timing structure than the home frequencies, while still supporting all co-services. For instance, a spillover frequency may have a predominance of voice slots, while the home frequency may have a predominance of slots sized for interactive data traffic, and possibly no voice slots.

In addition to the reserving of specific frequencies as spillover frequencies for on demand extra bandwidth, the present invention also relates to the use of a single frequency for inbound and outbound data. The frequency is divided into subchannels that are available on a contention basis, as described in commonly assigned U.S. Pat. No. 5,003,534. In that arrangement, certain subchannels are allocatable for use upon the satisfying of specific conditions, and are no longer subject to the contention process. The present invention improves upon this arrangement by providing a mechanism whereby the remote site can determine when it no longer needs the subchannel that has been allocated.

Figure 4:
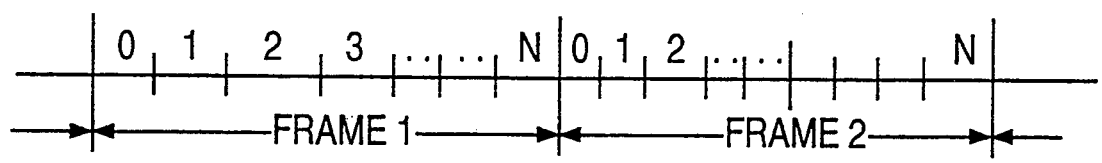
FIG. 4 illustrates a superframe divided into N slots per frame.

FIG. 4 illustrates a "superframe" which contains a number of frames, with each frame having a number "n" of slots. The inbound frequencies are shared and slotted into "slotted frequencies", using any of a variety of access methods. Similarly to the spillover frequency embodiment, certain events or conditions indicate the need for an extraordinary amount of bandwidth for a period of time. This includes, but is not limited to: network congestion, excess queuing or aging of data, perceived burst of traffic, circuit setup request, manual operator intervention, or timed events. When one or more of these occur, the network responds by reserving a portion of the bandwidth (i.e. a number of slots) for the demanding remote site. Although the beginning of the demand period is normally clearly defined, the end of the demand period may be less distinct because of intermittent traffic from other terminals or short-term pauses in the application that triggered the demand period. It is because of this that the present invention provides a "credit mechanism" as described below.

The remote is allocated a portion of the bandwidth by being assigned a number of slots, for example three slots per frame. So that these slots are not wasted, once the demand for the extra bandwidth is over, the utilization of the allocated slots is monitored by the remote. If the remote is not utilizing the allocated slots to a given extent, then the remote will return the allocated slots back for re-assignment. The utilization of the allocated slots is determined using a "credit mechanism".

The term "credit" is used here to mean the number of slots that a site may waste. A slot is wasted if it is exclusively assigned to a site and that site fails to use it. The remote, upon being allocated the slots, is given an initial credit, so that it may have some leeway to start using the slots. An "upcount" increases a remote's credit each time the remote uses a slot. A "downcount" decreases a remote's credit each time the remote fails to use a reserved slot. When the remote's credit falls to or below zero, the remote must send a terminating signal so that the slots can be reallocated.

An implicit priority scheme is provided by amount of initial credit that is to be given a remote, and the ratio of the amount of credit given for an upcount and that taken away by a downcount. For example, if a certain remote is to have a relatively high priority, then a large initial credit may be given to it, and more credit given to it for an upcount than is taken away by a downcount. This would obviously cause this remote a better opportunity to remain using the reserved slots longer than a remote which has a higher value for a downcount than for an upcount.

The operation of the credit mechanism should be readily apparent. Upon being granted reserved slots, a remote receives an initial credit, for example 15 credits. For each slot that it uses in the successive frames following the granting of the slots, the remote may receive, for example, 3 credits for each slot that it uses, and loses 2 credits for each slot that it fails to use. In this example, the remote will send a terminating signal after eight slots if it fails to use any of the slots, since it will have less than zero slots. If it does use the slots, however, the remote will keep using the slots until such time as its credit reaches or falls below zero. There is a limit to how long a remote may occupy the reserved slots, and this is the "credit limit", the maximum number of slots that a site may be credited. The credit limit obviates the problem of a single remote accumulating a huge number of credits and then tying up the reservation slots for an excessive amount of time.

Although described with respect to inbound bandwidth units, the above method can also be applied to other arrangements of bandwidth units, including outbound time-division units. Also, the credit mechanism above can be used to "pre-qualify" a remote site for a subchannel (the reserved slots) allocation. In such a case, the remote site would measure for a period of time whether it "needs" an allocation. In the above-described embodiments of the present invention, the network management 32 performs the credit counting, etc.

Figure 5:
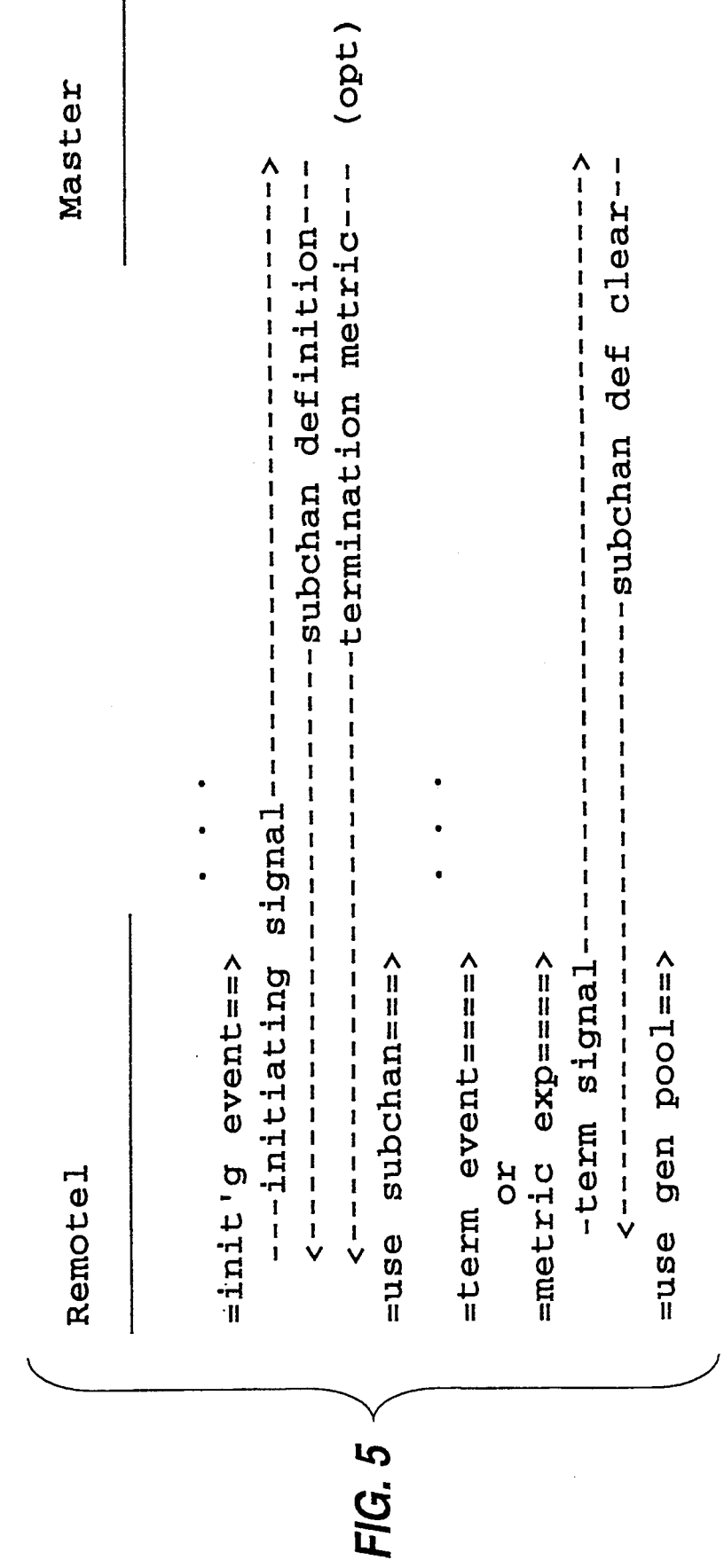
FIG. 5 illustrate an exemplary process according to an embodiment of the present invention for terminating an allocation, and for subdividing an allocated channel.

The process for establishing the reserved subchannel (slots) is illustrated in FIG. 5. The remote 1 will send an initiating signal after it has detected an initiating event. The master 10 will send back a subchannel definition and may also send back a termination metric. The remote 1 will then use the designated subchannel. After a termination event, or the credit reaches or falls below zero, the remote 1 sends the master 10 a termination signal. The master 10 sends a subchannel definition clear signal. The remote 1 then uses the general pool of subchannels that are available.

Instead of dividing the pool of allocatable slots into a set of determined, fixed subchannels, another embodiment of the present invention acts to subdivide channels. This prevents some remotes from being blocked from reserved allocation if fewer subchannels are defined than are actually needed. It also obviates the problem of a fixed bandwidth for the subchannels. Otherwise, if only one site is busy, it may only use 1/n of the available bandwidth, where 'n' is the number of available subchannels.

Figure 6:
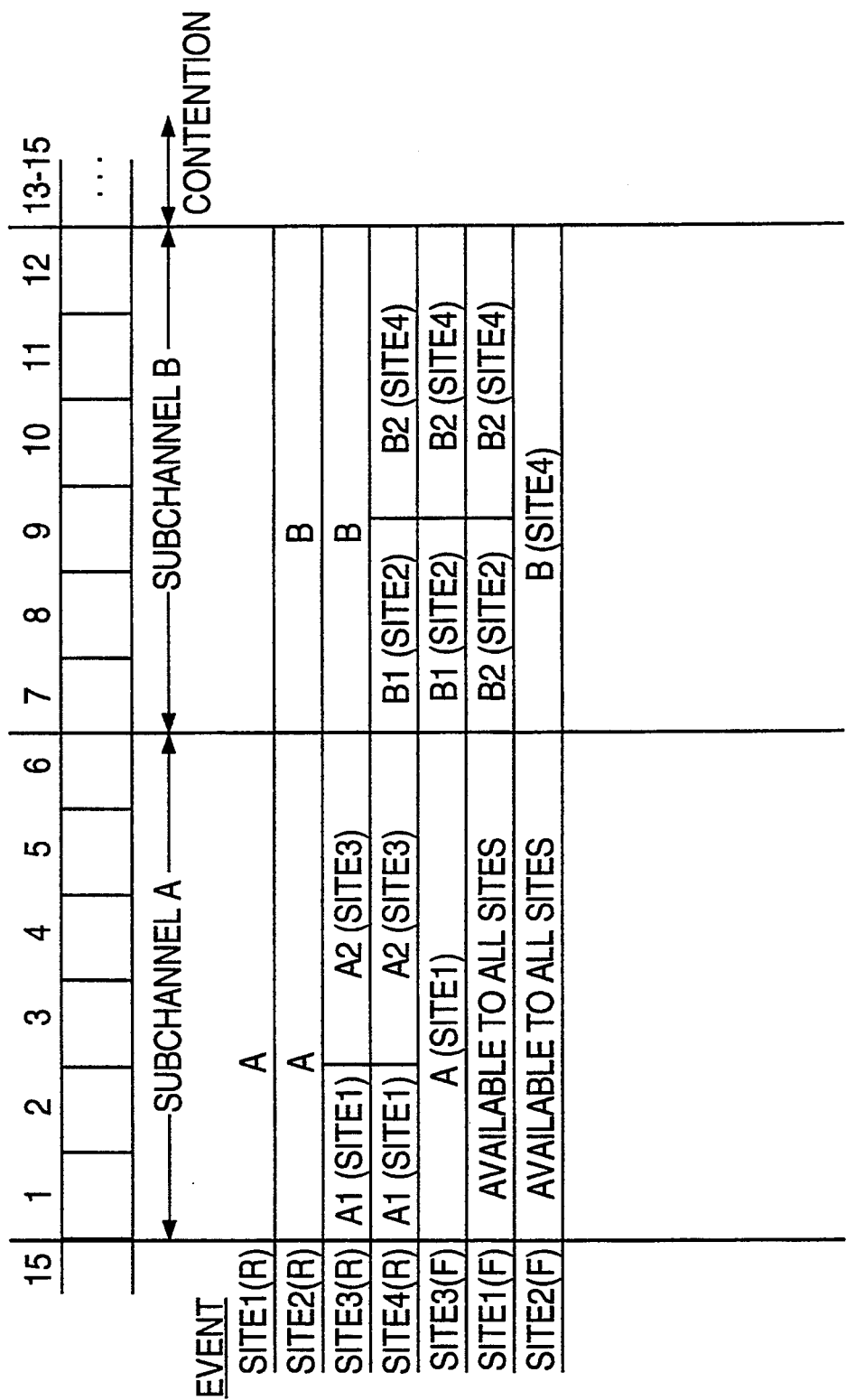
FIG. 6 shows graphically an example of a process of subdividing a channel in accordance with an embodiment of the present invention.

To overcome this limitation, the allocatable slots as described above are pre-arranged into 'n' initial subchannels, where n is any integer from 1 to 'm' and 'm' is the number of allocatable slots. The subchannels are allocated according to the methods described above. An example of the dividing of the channels into subchannels according to the method of the present invention is shown in FIG. 6. Before reviewing this example, the rules followed in this method are set forth below.

If a request for an allocation arrives at the master station from remote "S" and no subchannels are available, then the largest allocated subchannel "A" (allocated to site "F") will be divided into two subchannels, "A1" and "A2". Remote "F" will retain subchannel A1 and remote "S" will be allocated subchannel A2.

If remote F or remote S requests the deallocation of A1 or A2, then A1 and A2 will be re-combined into subchannel A. Subchannel A will be re-allocated to the remaining remote F or S. However, the initial subchannels will not be combined. In effect, the "initial" subchannels are considered a minimum number of available subchannels.

An embodiment of the method of the present invention prevents fragmentation of the subchannels by only re-combining subchannels with its "sibling". In other words, if subchannel A is divided into A1 and A2, A1 and A2 may only be re-combined back into A. A1 may not be re-combined with B2, for example. Other such procedures may be used for preventing fragmentation without departing from the scope of the invention.

Another embodiment of the invention imposes a maximum number of divisions in order to guarantee a minimum bandwidth of a subchannel. Still other dividing rule refinements can be followed without departing from the scope of the invention.

As seen in FIG. 6, there are 15 slots in a given frame, as an example. Slots 1-6 are Subchannel A and slots 7-12 are Subchannel B, with all of the slots in these subchannels being available for use on a contention basis when they are not reserved. Slots 13-15 remain available on a contention basis even when Subchannels A and B are reserved.

In the illustrated example, all of the slots are available at first on a contention basis. Remote 1 then experiences an event or condition which requires the allocation of reserved bandwidth to it, so it is granted slots 1-6, subchannel A. At some point in time thereafter, while remote 1 still requires extra bandwidth, remote 2 requires reserved bandwidth and is then allocated subchannel B. When remote 3 thereafter requires reserved bandwidth, there are no more slots left in the frame that can be reserved. In accordance with the dividing rules of the method of the present invention, subchannel A is divided in half so that remote 1 uses slots 1-3 and remote 3 uses slots 4-6 on a reserved basis.

When remote 4 needs reserved slots, subchannel B is divided, as shown. Thereafter, remote 3 signals that it no longer needs the reserved slots. The divided subchannel A now recombines so that only remote 1 is using the reserved slots of subchannel A. Should remote 1 now also terminate its demand for reserved slots, then the slots of subchannel A become available for use on a contention basis, while subchannel B remains divided between remotes 2 and 4.

The procedure for the establishment of a divisible subchannel according to the present invention is the same as that shown in FIG. 5.

The present invention also provides allocation integrity, which requires that the community of remotes sharing the bandwidth be aware of and abide by the allocations. This may be complicated due to a remote having a temporary inability to hear broadcasted allocation because of interference, rain fade, etc. It is also caused by the new installation of a remote into the network.

To overcome these problems, the present invention provides that a remote will signal the master 10 each time that it experiences a power interruption or machine reset. The master 10 then re-transmits all allocations to the remote, either by broadcasting or selectively addressing the remote. The master 10 may periodically broadcast a checksum or similar signal that represents the current allocations. Each site will use this signal to validate its stored record of current allocations. Any site that fails its validation will signal the master 10 to re-broadcast the current allocation. In another embodiment, the master 10 periodically re-broadcasts the complete current allocations (rather than a validation signal such as a table checksum).

The master 10 directly monitors abidance of allocations, and maintains a record of all allocations in a reservation table. The demodulator of the master 10 that is associated with the shared frequency is able to signal the occurrence of a collision on a slot. By correlating the collision signal with the reservation table, the master 10 is able to determine that at least one site is "disrespecting" an allocation. When this occurs, the master 10 will re-broadcast all allocations. It is also possible, as provided in another embodiment of the invention, to instead determine the specific allocations that are being violated and re-broadcast only those specific allocations.

Various functional arrangements are available for carrying out the above procedures. These functions include: detection of collisions, storage of reservation table, correlation of reservation table with collisions, and re-broadcast of allocations. These different functions can be provided in different locations according to different embodiments of the present invention. For example one or more of the functions will be located in the master's demodulation equipment that is associated with the shared frequency, while the remaining functions are located in the master station's control computer 40.

An illustrated example of the allocation integrity of the present invention is illustrated in FIG. 7. When the master is initially powered up, the master 10 then broadcasts an allocation table. After some time, remote 1 may have its power interrupted, so that it then sends a request to update the allocation to the master 10. The master 10 responds by sending the allocation table. A similar procedure is followed when the remote 1 has a reset.

FIG. 3 also shows the periodic broadcasting by the master 10 of an allocation checksum. The remote 1 will request an allocation update if there is a checksum fail.

If there is a collision signal detected by the demodulator, the master 10 correlates the reservation table with the collision and broadcasts the allocation table.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A communication network having a master and a plurality of remotes, said remotes supporting a plurality of co-services, the network comprising:
    means for sharing access to an inbound frequency among the remotes, over which inbound frequency information signals, are transmitted from a remote to said master;
    means for detecting a need by a remote for an extraordinary amount of bandwidth in excess of that currently being provided by said inbound frequency for the transmission of information signals;
    means for allocating to said remote a reserved amount of bandwidth in response to the detection of said need for extraordinary bandwidth for said remote; and
    means for informing each of the remotes of the network of the allocations of the bandwidth.

2. The network of claim 1, wherein the master includes means for periodically broadcasting a signal to the remotes which represents a current allocation, and each remote includes means for receiving and determining from this signal whether the remote has a current allocation.

3. The network of claim 1, wherein the master includes means for periodically broadcasting a signal to the remotes which represents a validation signal, and each remote includes means for receiving and determining from this validation signal whether the remote has a current allocation.

4. The network of claim 1, wherein the master includes means for detecting the occurrence of a collision on a slot of a frequency, and means for correlating the collision with a reservation table to determine that a remote is disrespecting an allocation.

5. The network of claim 4, wherein the master includes means for broadcasting a signal to a remote which represents an allocation, and wherein the master further comprises means for re-broadcasting said allocation when the master determines that a remote is disrespecting said allocation.

6. A method of providing allocation integrity to a communication network having a master and a plurality of remotes, said remotes supporting a plurality of co-services, the method comprising:
    sharing access to an inbound frequency among the remotes over which inbound frequency information signals are transmitted from a remote to said master;
    detecting a need by a remote for an extraordinary amount of bandwidth in excess of that currently being provided by said inbound frequency for the transmitted information signals;
    allocating to said remote a reserved amount of bandwidth in response to the detection of said need for extraordinary bandwidth for said; and
    informing each of the remotes of the network of the allocations of the bandwidth.

7. The method of claim 6, further comprising the step of the master periodically broadcasting a signal to the remotes which represents a current allocation, and the step of each remote receiving and determining from this signal whether the remote has a current allocation.

8. The method of claim 6, further comprising the step of the master periodically broadcasting a signal to the remotes which represents a validation signal, and the step of each remote receiving and determining from this validation signal whether the remote has a current allocation.

9. The method of claim 6, further comprising the steps of the master detecting the occurrence of a collision on a slot of a frequency, and correlating the collision with a reservation table to determine that a remote is disrespecting an allocation.

10. The method of claim 9, further comprising the steps of the master broadcasting allocations to remotes and the master re-broadcasting allocations when the master determines that a remote is disrespecting an allocation.

* * * * *